Figures 1, 4:
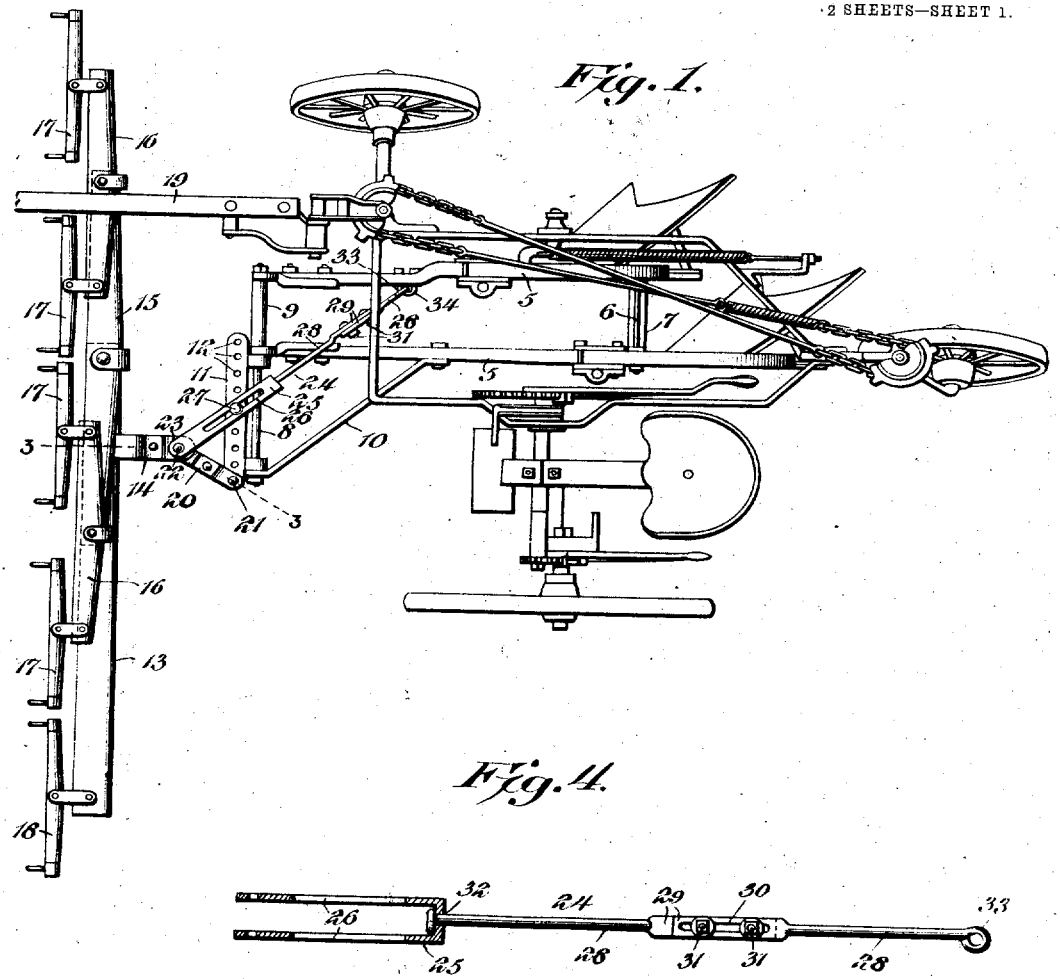

No. 819,256. PATENTED MAY 1, 1906.
W. L. VIEBROCK.
DRAFT EQUALIZER.
APPLICATION FILED AUG. 7, 1905.

2 SHEETS—SHEET 1.

Witnesses
Howard D. Orr.

W. L. Viebrock, Inventor,
By E. G. Siggers
Attorney

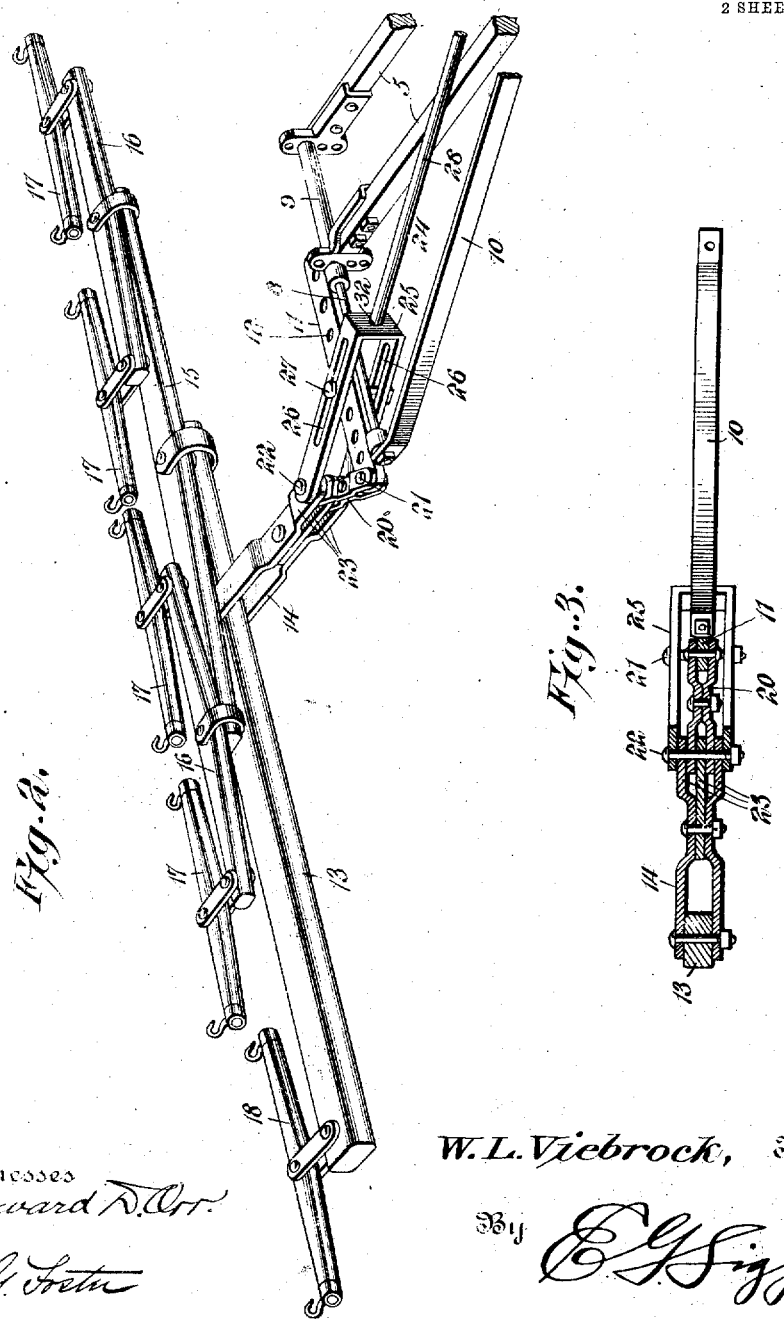

UNITED STATES PATENT OFFICE.

WILLIAM L. VIEBROCK, OF LIME SPRING, IOWA.

DRAFT-EQUALIZER.

No. 819,256.　　　　Specification of Letters Patent.　　　　Patented May 1, 1906.

Application filed August 7, 1905. Serial No. 273,070.

*To all whom it may concern:*

Be it known that I, WILLIAM L. VIEBROCK, a citizen of the United States, residing at Lime Spring, in the county of Howard and State of Iowa, have invented a new and useful Draft-Equalizer, of which the following is a specification.

The present invention has more particular reference to means for hitching a number of draft-animals to an agricultural implement, such as a plow, though not necessarily limited in this respect.

One of the principal objects is to provide a novel structure of the above character that may be connected to a plow and will so locate the draft-animals with respect thereto that all but one will be upon unplowed ground, while the one will walk in the last or open furrow. Thus none of the animals are compelled to walk upon plowed ground, and their full strength is secured without any abnormal or undue work being placed upon one.

Another and important object is to provide means whereby the evener may be readily adjusted with respect to the implement in order that side drafts or other lateral strains may be entirely eliminated.

The preferred embodiment of the invention is illustrated in the accompanying drawings, wherein—

Figure 1 is a plan view of a plow with the equalizer connected thereto. Fig. 2 is a perspective view of said equalizer. Fig. 3 is a sectional view on the line 3 3 of Fig. 1. Fig. 4 is a view, partly in elevation and partly in section, of the holding-link.

Similar reference-numerals designate corresponding parts in all the figures of the drawings.

In the embodiment illustrated a wheel-plow is shown, two plows being carried thereby and having spaced beams 5. The rear portion of these beams are connected by a tie-bolt 6 and a spacing device 7, interposed between the beams and carried by the bolt. The front end of the beams are also connected by a tie-bolt 8 and are held in spaced relation by a sleeve 9, interposed between the beams and mounted on the bolt 8. This bolt, as clearly shown in Figs. 1 and 2, projects beyond one of the beams 5, its free end being connected to said beam by a rearwardly-extending brace 10. Journaled on the projecting end of the tie-bolt 8, between the brace 10 and the adjacent beam 5, is a clevis 11, provided with the usual series of openings 12, said clevis being thus horizontally disposed and being located at one side of the beams.

An evener is employed, consisting of a lever 13, fulcumed to a rearwardly-extending yoke 14, the fulcrum being located nearer one end of the lever 13 than the other. Upon the shorter arm of the lever is pivoted a whiffletree 15, and on the ends thereof are mounted the usual doubletrees 16, carrying swingletrees 17. To the longer arm of the lever 13 is connected another swingletree 18. The usual tongue 19, connected to the plow-frame, extends in advance of the vehicle between the two right-hand swingletrees. It will thus be seen that in the present five-horse evener four of the animals will be located on unplowed ground, while the fifth can walk in the last smooth open or dead furrow.

The vehicle is connected to the plow by the following means: A link 20, composed of strap-sections, has its rear end embracing and pivoted as shown at 21, to the clevis 11, the pivot-bolt 21 being adjustable along said clevis. The front end of the link 20 is pivoted by a bolt 22 to and between a set of three ears 23, formed at the rear end of the yoke 14. As shown particularly in Fig. 1, the link 20 is disposed in angular relation to the clevis 11, and its angular relation is maintained by means of a holding-link 24, the front end of which is in the form of a stirrup 25, that slidably embraces the tie-bolt 8 and clevis 11 and is connected to the rear end of the yoke 14, and consequently to the front end of the link 20, by the pivot-bolt 22. This stirrup is provided with longitudinally-disposed slots 26, through which passes a guide-bolt 27, that also passes through one of the openings 12 of the clevis 11. The rear portion of the link 24 consists of rod-sections 28, having flat portions 29, overlapped and provided with slots 30, through which are passed holding-bolts 31. The front section is swiveled, as shown at 32, in the rear end of the stirrup 25, while the rear section has at its rear end an eye 33, that receives a clip 34, fastened to the outer plow-beam 5. It will thus be seen that the link 24 is extensible, that it is slidably associated with the clevis 11, and that it maintains the link 20 in angular relation to said clevis.

With this structure, therefore, none of the draft-animals has to travel over the open or rough plowed ground, and consequently none has to do more than its share of work. At the same time the connections are such that there is no side draft, and by shortening or lengthening the link 24 not only can all lateral strains of this sort be eliminated, but the said link permits the ready attachment of the equalizer to different implements and, furthermore, allows the link 20 to be adjusted at any desired position upon the clevis 11. Furthermore, the animals are directly connected to both beams by the relatively movable links 20 and 24, the main draft being, perhaps, on the link 20, and while the same is disposed diagonally of the line of draft side draft thereby is prevented by the opposite disposition of the other link 24, the action of which can be varied by shortening or extending it to throw said link 20 more or less transversely of said line of draft. The link 24, moreover, with its connections imparts draft to the opposite side of the plow to that carrying the whiffletrees, and its longitudinal strain diagonally of the line of draft is opposed to that of the other angularly-disposed link 20. The spaced and adjustable connections 21 and 27 are important features; the same maintaining the relative positions of the draft-links with respect to the clevis, but further than this the bolt 27 prevents the lateral play of the stirrup and link when a turn is made to the right and is readily adjustable in changing the spaces between the beams to regulate the furrows.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with an evener, of a substantially horizontal clevis, means for connecting the clevis to an implement, a link connecting the evener and clevis and disposed in angular relation to the line of draft, another link connected to the evener and disposed diagonally of the line of draft and in angular relation to the first-mentioned link, said latter link extending diagonally across the clevis and in rear of the same, and means for connecting the link to an implement in rear of and at one side of the clevis.

2. The combination with an evener, of a substantially horizontal clevis, means for securing the clevis to one side of an implement, a link connecting the evener and clevis and disposed in angular relation to the line of draft, an extensible link connected to the evener and disposed diagonally of the line of draft and in angular relation to the first-mentioned link, said extensible link being disposed diagonally across the clevis and in rear of the same, a guide device adjustably mounted on the clevis and engaging the extensible link, and means for connecting said extensible link to an implement in rear of the clevis.

3. The combination with an evener including a yoke, of a clevis, a link pivoted to the yoke and to the clevis, another link pivoted to the yoke and extending diagonally across the clevis, and means for pivotally securing the rear end of the latter link to an implement.

4. The combination with an evener, of a clevis, means for attaching the clevis to an implement, a swinging connection between the clevis and the evener, and means connected to the evener and to the implement independently of the clevis for holding said swinging connection in different angular relations.

5. The combination with an evener, of a clevis, means for attaching the clevis to an implement, a swinging connection between the clevis and evener, and an extensible link connected to the evener and having means for attachment to the implement independently of the clevis for holding said swinging connection in different angular relations to the clevis.

6. The combination with an evener, of a clevis, means for attaching the clevis to the front portion of an implement, a swinging connection between the clevis and evener, and means connected to the evener and having a device arranged to be attached to an intermediate portion of the implement, said means holding the swinging connection in different angular relations and being slidably associated with the clevis.

7. The combination with a clevis, of means for connecting the same to an implement, an evener, a link connection between the clevis and evener, and means for holding the link connection in different angular relations with respect to the clevis said means being slidably associated with the clevis.

8. The combination with a clevis, of means for connecting the same to an implement, an evener, a link connection between the clevis and evener, and means for holding the link connection in different angular relations with respect to the clevis, said means including a stirrup that embraces the clevis.

9. The combination with a clevis, of means for connecting the same to an implement, an evener, a link connection between the clevis and evener, and an extensible link for holding the said link connection in different angular relations with respect to the clevis, said link comprising a sectional rod having means at its rear end for attachment to an implement, and a stirrup secured to the front end of the rod, said stirrup slidably embracing the clevis and being pivoted to the link connection.

10. The combination with a plurality of plow-beams, of a rod connecting and projecting beyond one side of the same, a clevis pivoted to the projecting end of the rod, an evener, a link connecting the evener and clevis and means connecting the evener and beams independently of said clevis.

11. The combination with a plurality of spaced plow-beams, of a tie-rod connecting the same and projecting beyond one side thereof, a clevis journaled upon the projecting portion of the tie-rod, an evener having a rearwardly-extending yoke, a link pivotally connecting the yoke and clevis, a stirrup pivotally connected to the yoke and slidably embracing the clevis, and an extensible rod the connected to the stirrup and to one of the plow-beams.

In testimony that I claim the foregoing as my own I have hereto affixed my signature in the presence of two witnesses.

WILLIAM L. VIEBROCK.

Witnesses:
A. E. McCULLOCH,
M. B. DAVIS.

---

Correction in Letters Patent No. 819,256.

It is hereby certified that in Letters Patent No. 819,256, granted May 1, 1906, upon the application of William L. Viebrock, of Lime Spring, Iowa, for an improvement in "Draft-Equalizers," an error appears in the printed specification requiring correction, as follows: In line 20, page 3, the word "the" before the word "connected" should be stricken out; and that the said Letters Patent should be read with this correction therein that the same may conform to the record of the case in the Patent Office.

Signed and sealed this 15th day of May, A. D., 1906.

[SEAL.]

F. I. ALLEN,
*Commissioner of Patents.* rod, said stirrup slidably embracing the clevis and being pivoted to the link connection.

10. The combination with a plurality of plow-beams, of a rod connecting and projecting beyond one side of the same, a clevis pivoted to the projecting end of the rod, an evener, a link connecting the evener and clevis and means connecting the evener and beams independently of said clevis.

11. The combination with a plurality of spaced plow-beams, of a tie-rod connecting the same and projecting beyond one side thereof, a clevis journaled upon the projecting portion of the tie-rod, an evener having a rearwardly-extending yoke, a link pivotally connecting the yoke and clevis, a stirrup pivotally connected to the yoke and slidably embracing the clevis, and an extensible rod the connected to the stirrup and to one of the plow-beams.

In testimony that I claim the foregoing as my own I have hereto affixed my signature in the presence of two witnesses.

WILLIAM L. VIEBROCK.

Witnesses:
A. E. McCULLOCH,
M. B. DAVIS.

---

Correction in Letters Patent No. 819,256.

It is hereby certified that in Letters Patent No. 819,256, granted May 1, 1906, upon the application of William L. Viebrock, of Lime Spring, Iowa, for an improvement in "Draft-Equalizers," an error appears in the printed specification requiring correction, as follows: In line 20, page 3, the word "the" before the word "connected" should be stricken out; and that the said Letters Patent should be read with this correction therein that the same may conform to the record of the case in the Patent Office.

Signed and sealed this 15th day of May, A. D., 1906.

[SEAL.]

F. I. ALLEN,
*Commissioner of Patents.*

Correction in Letters Patent No. 819,256.

It is hereby certified that in Letters Patent No. 819,256, granted May 1, 1906, upon the application of William L. Viebrock, of Lime Spring, Iowa, for an improvement in "Draft-Equalizers," an error appears in the printed specification requiring correction, as follows: In line 20, page 3, the word "the" before the word "connected" should be stricken out; and that the said Letters Patent should be read with this correction therein that the same may conform to the record of the case in the Patent Office.

Signed and sealed this 15th day of May, A. D., 1906.

[SEAL.]

F. I. ALLEN,
*Commissioner of Patents.*